D. VAN HOVENBERG.
Milk-Cooler.
No. 218,463.  Patented Aug. 12, 1879.
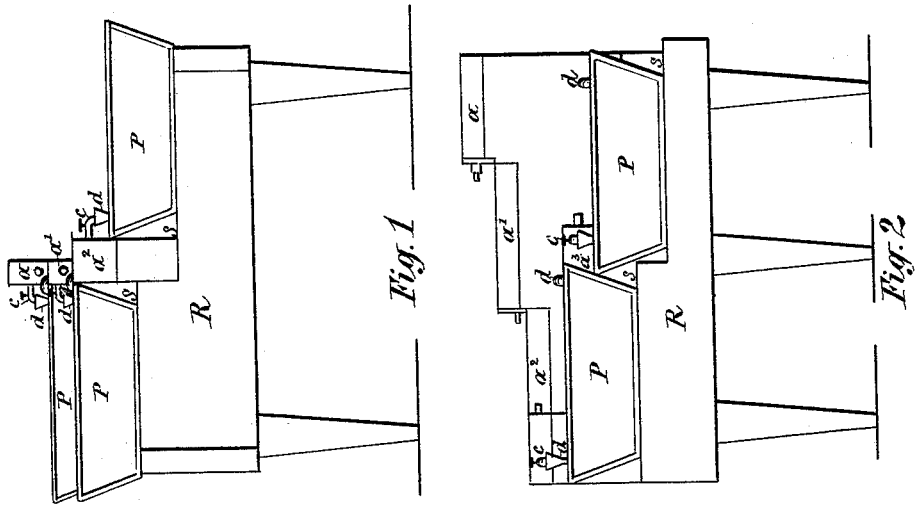
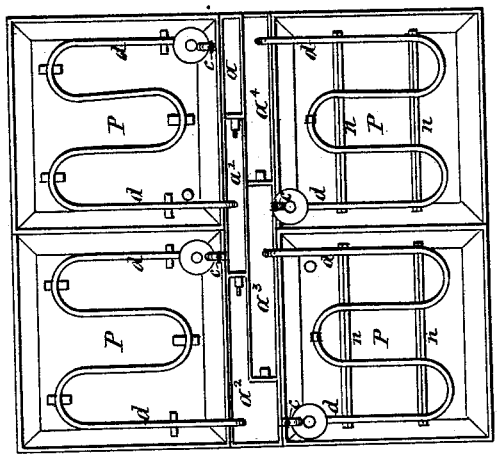
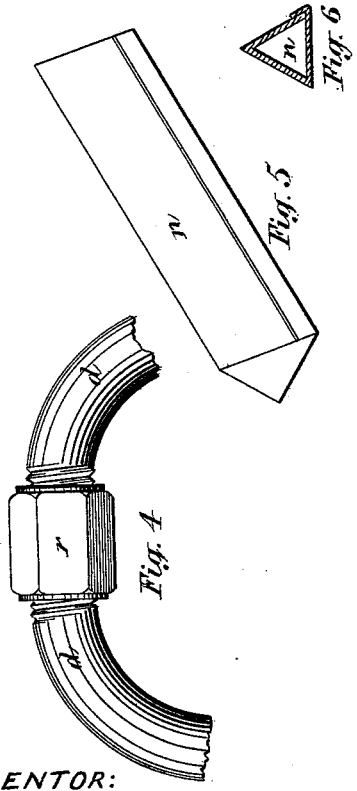
WITNESSES:
Fred. J. Bailey.
C. Bendixen.
INVENTOR:
David Van Hovenberg
per C. Lauss, his Attorney.

UNITED STATES PATENT OFFICE.

DAVID VAN HOVENBERG, OF POMPEY, NEW YORK.

IMPROVEMENT IN MILK-COOLERS.

Specification forming part of Letters Patent No. 218,463, dated August 12, 1879; application filed April 21, 1879.

*To all whom it may concern:*

Be it known that I, DAVID VAN HOVENBERG, of Pompey, in the county of Onondaga and State of New York, have invented new and useful Improvements in Milk-Coolers, of which the following, taken in connection with the accompanying drawings, is a full, clear, and exact description.

This invention relates to that class of milk cooling or tempering apparatus in which the tempering-water is conducted through a pipe immersed in the milk; and it consists in a novel combination, with a series of milk-pans set in different planes in a rack, and provided in their interior with a pipe having its inlet and discharge ends both at one side of the pan, of troughs arranged along the outer edge of the pans, and provided with means for communicating with each other either direct or through the medium of the pipes in the pans, by which arrangement large and varying quantities of milk can be treated with a limited amount of cooling-water, and the process of cooling or tempering the milk is readily and perfectly controlled.

The invention is clearly illustrated in the accompanying drawings, wherein—

Figure 1 is an end view of my improved milk-cooling apparatus; Fig. 2, a side view of same; Fig. 3, a plan view; Fig. 4, an enlarged detail view of the connection of a sectional milk-cooling pipe; and Figs. 5 and 6 are, respectively, an enlarged isometric view and a transverse section of the support of the immersed cooling-pipe.

Similar letters of reference indicate corresponding parts.

R represents the milk-rack, constructed with two rows of shelves, $s$ $s$, arranged side by side, each succeeding shelf being on a lower plane than the preceding one, and bringing the highest and lowest shelves to one end of the rack.

P P represent the milk-pans set on the aforesaid shelves. Each of these pans is provided with a sinuous or serpentine pipe, $d$, which is immersed in the milk, and has its inlet and discharge end or overflow at one side of the pan. The discharge end is bent over the top edge of the pan, and the inlet or reception end is extended relatively higher to cause the water to flow through said pipe.

Between the two rows of pans are a series of troughs, $a$ $a^1$ $a^2$ $a^3$ $a^4$, arranged along the top edge of the pans respectively. The first trough, $a$, is extended part way the length of the highest pan and elevated above the same, and is provided on the side with a faucet, $c$, which communicates with the reception end of the cooling-pipe $d$ in said pan. The second trough, $a^1$, is arranged with its top flush with the top of the first pan, and extended from the end of the first trough, $a$, to part way the length of the second pan, and is thus made to project above the latter.

The discharge end of the cooling-pipe $d$ in the first pan deposits the water, after completing its circuit through said pan, into the second trough, $a^1$, which, being provided with a faucet over the inlet of the pipe $d$, in the second pan, conveys the water to the latter, and in this manner the cooling-water is circulated from pan to pan throughout the apparatus. In case the temperature of the water is rendered unsuitable for the purpose, ice may be placed in those troughs where deemed necessary.

Each trough is provided with a suitable outlet, by which the water can be discharged direct into the adjacent trough.

In case the number of pans employed is reduced, or some of the intermediate pans removed from the rack, or found to have been sufficiently subjected to the cooling agent, the faucet which admits the water to the pipe in said pan or pans may be closed and the direct communication between the troughs opened to continue the cooling or tempering process in the remaining pans.

To facilitate the cleaning of the pipe $d$, I construct it of sections united by a detachable coupling, $r$, having right and left screw-threads, respectively, at opposite ends, by which it engages the threaded ends of two section of said pipe.

$n$ is a triangular bar upon which the pipe $d$ is supported.

I am aware that the cooling-water has been conducted from an immersed pipe in one pan into that in another pan by the medium of a tank containing the first pan, and an overflow-pipe extended from said tank to the immersed pipe in the pan on the next lower plane; but such an arrangement does not afford the means of properly controlling the temperature of the cooling-water in each individual pan, inasmuch as ice placed in the tank will affect the milk set therein as much as that set in the succeeding tank. By my improvement the ice is placed in a trough isolated from the milk-pans and incapable of affecting others than that to which the water is directed. Having a stop-cock or adjustable outlet at the end of each trough communicating with the adjacent trough, I am enabled to divert the cooling agent from any intermediate pan not requiring the additional refrigeration, and convey it direct to where it is deemed necessary. Hence I do not claim, broadly, the arrangement of repeated use of the cooling-water; but What I do claim as new, and desire to secure by Letters Patent, is—

The pans P P, provided with the immersed pipe $d$, in combination with the isolated refrigerating-troughs $a$ $a^1$ $a^2$ $a^3$ $a^4$, communicating with each other directly by an adjustable outlet at one end, and each intermediate trough having one end in communication with the discharge end of the pipe $d$ of one pan, and provided at the other end with a faucet, $c$, communicating directly with the inlet of the pipe $d$ of the adjacent pan, substantially as described and shown, for the purpose set forth.

In testimony whereof I have hereunto signed my name and affixed my seal, in the presence of two attesting witnesses, at Syracuse, in the county of Onondaga and State of New York, this 16th day of April, 1879.

DAVID VAN HOVENBERG. [L. S.]

Witnesses:
  A. WOOD,
  C. BENDIXEN.